United States Patent
Cengil et al.

(10) Patent No.: US 11,225,142 B2
(45) Date of Patent: Jan. 18, 2022

(54) METHOD AND DEVICE FOR CONTROLLING THE AIR-CONDITIONING FUNCTION OF A TRANSPORTATION VEHICLE SEAT

(71) Applicant: VOLKSWAGEN AKTIENGESELLSCHAFT, Wolfsburg (DE)

(72) Inventors: Sükrü Cengil, Burgwedel (DE); Andrea Schnurr, Mariental (DE); Marina Belun, Hannover (DE); Jan Peter Herdey, Braunschweig (DE); Oliver Wolf, Wolfsburg (DE)

(73) Assignee: Volkswagen Aktiengesellschaft

( * ) Notice: Subject to any disclaimer, the term of this patent is extended or adjusted under 35 U.S.C. 154(b) by 432 days.

(21) Appl. No.: 16/313,679

(22) PCT Filed: Jun. 29, 2017

(86) PCT No.: PCT/EP2017/066203
§ 371 (c)(1),
(2) Date: Dec. 27, 2018

(87) PCT Pub. No.: WO2018/002262
PCT Pub. Date: Jan. 4, 2018

(65) Prior Publication Data
US 2019/0225081 A1    Jul. 25, 2019

(30) Foreign Application Priority Data
Jun. 30, 2016 (EP) .................... 16177359

(51) Int. Cl.
*B60N 2/56* (2006.01)
*B60K 35/00* (2006.01)
(Continued)

(52) U.S. Cl.
CPC ............ *B60K 35/00* (2013.01); *B60N 2/0228* (2013.01); *B60N 2/565* (2013.01); *B60N 2/5657* (2013.01);
(Continued)

(58) Field of Classification Search
CPC .... B60N 2/5685; B60N 2/0228; B60N 2/565; B60N 2/5657; B60N 2/976; B60N 2/0244; B60K 2370/152; B60K 2370/1438
(Continued)

(56) References Cited

U.S. PATENT DOCUMENTS

2016/0355113 A1    12/2016  Soennichsen

FOREIGN PATENT DOCUMENTS

| DE | 102009056675 A1 | 6/2011 | |
| DE | 102011106359 A1 * | 1/2013 | ........... B60N 2/5685 |
| DE | 102011110579 A1 | 2/2013 | |

OTHER PUBLICATIONS

Search Report for International Patent Application No. PCT/EP2017/066203; dated Sep. 22, 2017.

* cited by examiner

*Primary Examiner* — Edelmira Bosques
*Assistant Examiner* — Dana K Tighe
(74) *Attorney, Agent, or Firm* — Barnes & Thornburg LLP

(57) ABSTRACT

A method for controlling the air-conditioning function of a transportation vehicle seat wherein a value of an air-conditioning parameter is set by an operating element which is moved from a null position in two opposite directions. The air-conditioning parameter controls the distribution of an air-conditioning function in different regions along a first direction indicated by the geometry of the transportation
(Continued)

vehicle seat. The separate regions include at least one first and second region. A uniform distribution of the air-conditioning function is produced in the regions in the null position of the operating element. When the operating element is moved in one direction of the two opposite directions, the value of the air-conditioning parameter for at least one of the first and second regions remains constant and is changed for at least the other of the first and second regions. Also disclosed is a device for carrying out the method.

17 Claims, 2 Drawing Sheets

(51) Int. Cl.
*B60N 2/02* (2006.01)
*B60N 2/90* (2018.01)

(52) U.S. Cl.
CPC .... *B60N 2/5685* (2013.01); *B60K 2370/1438* (2019.05); *B60K 2370/152* (2019.05); *B60N 2/0244* (2013.01); *B60N 2/976* (2018.02)

(58) Field of Classification Search
USPC ........................................................ 454/120
See application file for complete search history.

METHOD AND DEVICE FOR CONTROLLING THE AIR-CONDITIONING FUNCTION OF A TRANSPORTATION VEHICLE SEAT

PRIORITY CLAIM

This patent application is a U.S. National Phase of International Patent Application No. PCT/EP2017/066203, filed 29 Jun. 2017, which claims priority to European Patent Application No. 16177359.3, filed 30 Jun. 2016, the disclosures of which are incorporated herein by reference in their entireties.

SUMMARY

Illustrative embodiments relate to a method for controlling the climate control function of a transportation vehicle seat. Furthermore, illustrative embodiments relate to a device for controlling the climate control function of a transportation vehicle seat having a climate control device, using which a value of a climate control parameter is settable.

BRIEF DESCRIPTION OF THE DRAWINGS

The disclosed embodiments will now be explained in detail with reference to the drawings.

DETAILED DESCRIPTION

Figure 1:
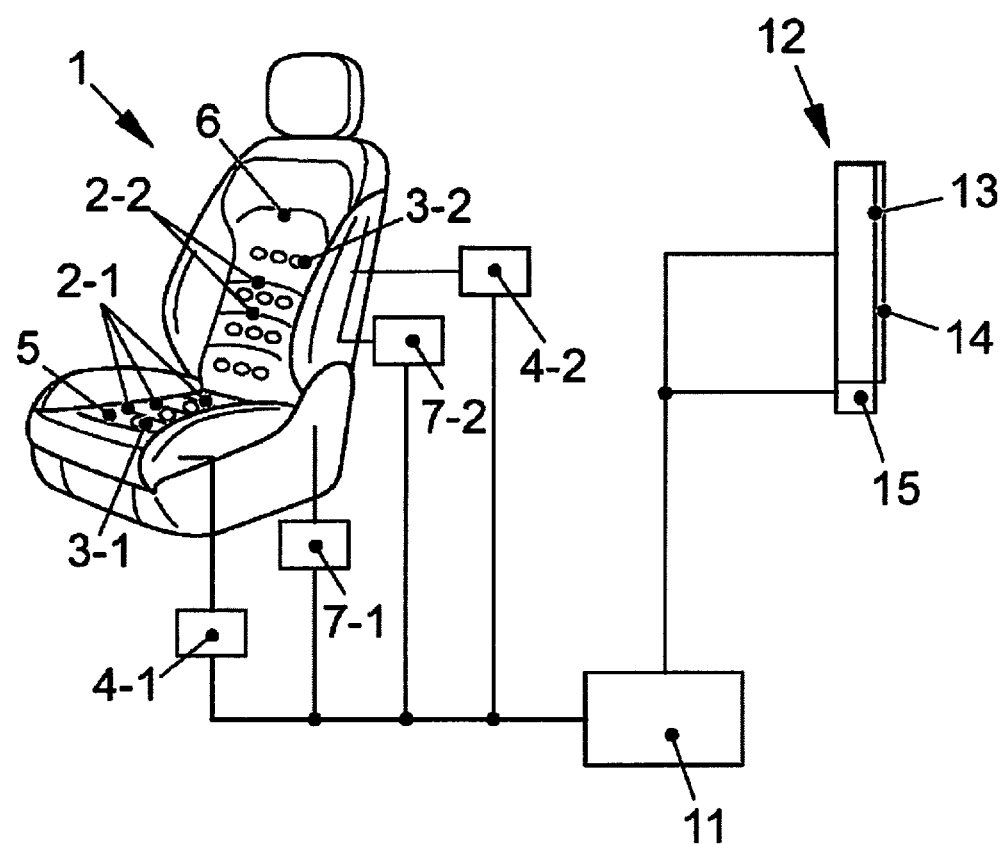
FIG. 1 schematically shows an exemplary embodiment of the disclosed device.

In modern transportation vehicles, a plurality of devices is provided, which can be electronically operated. Therefore, the operation often no longer takes place via mechanical operating elements, but rather via a user interface, which comprises a display area and an associated input device, for example, a touch-sensitive surface. Since the direct relationship between an operating element and the device to be operated no longer exists in such operating systems, the challenge results that the operating concept and the information displayed in conjunction with the operation are to be easily, intuitively, and rapidly comprehensible to the user.

Equipping a transportation vehicle seat with a seat heater, using which the surface of the transportation vehicle seat can be heated in various regions, is known. The climate control parameter in this case is the seat heater, the heating power of which can be set by an operating element. Furthermore, seat ventilators are known, by which the seat can be ventilated from the inside to the outside. However, it has been shown that in the case of known climate control functions for a transportation vehicle seat, the control options for the user are in need of improvement. The climate control parameters can be adapted better to the needs of the user.

Disclosed embodiments provide a method and a device of the type mentioned at the outset, using which a control having an improved adaptation of the climate control function of the transportation vehicle seat is possible.

In the disclosed method, a value of a climate control parameter is set by an operating element. In this case, the operating element is movable from a neutral position in two opposing directions. The climate control parameter controls the distribution of a climate control function in separate regions along a first direction characterized by the geometry of the transportation vehicle seat. The separate regions comprise at least one first and one second region. In a neutral position of the operating element, an equal distribution of the climate control function in the regions is generated. If the operating element is moved in one of the two opposing directions, the value of the climate control parameter remains constant for at least one region of the first and second regions and it is changed for at least the other of the first and second regions.

Therefore, a balance function adapted especially to the climate control function of a transportation vehicle seat is provided by the disclosed method. In this case, a change in the two regions of the transportation vehicle seat adapted especially to the needs of the climate control function of a transportation vehicle seat can be generated by the operating element. In this way, a more accurate control of the climate control function of the transportation vehicle seat is provided.

The opposing directions of the operating element can be two opposing directions on a straight line. However, they can also be opposing directions on arbitrarily curved lines. For example, the two opposing directions can be opposing rotational directions.

The first direction, which is characterized by the geometry of the transportation vehicle seat, can be, for example, a longitudinal direction or a transverse direction of the transportation vehicle seat. The longitudinal direction extends, in this case, from the upper edge of the backrest downward to the transition to the seat surface of the transportation vehicle seat and from there forward up to the front edge of the seat surface or in the reverse direction, respectively. In the disclosed method, the climate control parameter is changed in this direction, wherein at least two separate regions are formed. The first region can be located in this case, for example, within the backrest and the second region within the seat surface of the transportation vehicle seat.

According to at least one exemplary embodiment of the disclosed method, if the operating element is moved in a second direction, the value of the climate control parameter remains constant for at least the first region and is decreased for at least the second region. Furthermore, if the operating element is moved in a third direction opposite to the second direction, the value of the climate control parameter remains constant for at least the second region and is decreased for at least the first region. This disclosed embodiment provides control of the change of the climate control parameter for the two regions. The operating element is moved in the second direction. However, in this way the value of the climate control parameter is elevated neither in the first region nor in the second region. Nonetheless, the value of the climate control parameter for the regions is changed for both regions so that the value for the first region is greater after the change than the value for the second region.

According to at least one exemplary embodiment of the disclosed method, the value of the climate control parameter is decreased all the more for the second region the greater the movement or the distance of the operating element is from the neutral position in the second direction. Similarly, the value of the climate control parameter for the first region can be decreased all the more the greater the movement or the distance of the operating element from the neutral position is in the third direction. When the operating element is moved in one direction, the value of the climate control parameter thus remains constant in one region. In contrast, it is successively decreased in the other region the farther the operating element is moved away from the neutral position. In this manner, a control of the climate control function which is adapted especially to the climate control function of a transportation vehicle seat, is intuitively operable, and is accurate is provided.

According to another exemplary embodiment of the disclosed method, if the operating element is moved in the second direction, the value of the climate control parameter remains constant for at least the second region and is increased for at least the first region. Furthermore, if the operating element is moved in the third direction opposite to the second direction, the value of the climate control parameter remains constant for at least the first region and is increased for at least the second region. In this disclosed embodiment, the user can intuitively move the operating element in the direction which is associated with the region in which the value of the climate control parameter is to be increased. At the same time, however, the value of the climate control parameter of the other region remains constant.

The value of the climate control parameter is increased all the more for the first region the greater the distance of the operating element is from the neutral position in the second direction. Furthermore, the value of the climate control parameter is increased all the more for the second region the greater the distance of the operating element is from the neutral position in the third direction. If the operating element is moved in one direction, the value of the climate control parameter therefore remains constant in one region. In the other region, in contrast, it is successively increased the farther the operating element is moved away from the neutral position. In this manner, a control of the climate control function which is adapted especially to the climate control function of a transportation vehicle seat, is intuitively operable, and is accurate is provided.

The operating element comprises a slide element. For example, the slide element can be a switch element, which is displayed on a display area. In this case, a marking is provided, which can be displaced by way of a suitable input device by the user on a scale. By way of this disclosed embodiment of the operating element, the control of the climate control function of the transportation vehicle seat can be integrated in a cost-effective and simple manner into an existing operating system, which comprises a display area for displaying operating elements as switch elements.

According to a further exemplary embodiment of the disclosed method, a graphic element of the transportation vehicle seat to be climate controlled is displayed on the display area. The switch element is arranged in this case on the display area so that a displacement of the slide element represented by the switch element in the second direction represents an association with the backrest of the transportation vehicle seat represented by the graphic element. Similarly, a displacement of the slide element represented by the switch element in the third direction represents an association with the seat surface of the transportation vehicle seat represented by the graphic element. The user can comprehend easily by way of the switch element and the associated graphic element for the transportation vehicle seat to be climate controlled how an actuation of the switch element changes the climate control function of the transportation vehicle seat.

If the switch element is displaced in the second direction, the value of the climate control function for the backrest of the transportation vehicle seat remains constant. The value of the climate control function for the seat surface is decreased, in contrast. Vice versa, if the switch element is displaced in the third direction, the value of the climate control function for the seat surface remains constant and the value for the climate control function of the backrest is decreased.

Alternatively, if the switch element is displaced in the second direction, the value of the climate control function for the seat surface of the transportation vehicle seat remains constant and the value of the climate control function for the backrest is increased, in contrast. Vice versa, if the switch element is displaced in the third direction, the value of the climate control function for the backrest remains constant and the value for the climate control function of the seat surface is increased.

According to a further exemplary embodiment of the disclosed method, the value of a further climate control parameter is controlled by a further operating element, wherein the further climate control parameter controls the distribution of the further climate control function in the separate regions along the first direction. In this case as well, in a neutral position of the further operating element, an equal distribution of the further climate control function in the regions is generated. If the further operating element is moved in one of the two opposing directions, the value of the further climate control parameter remains constant for at least one region of the first and second regions and is changed for at least the other region of the first and second regions. The climate control function of the transportation vehicle seat can be set in an even more accurate and user-friendly manner by the control of a value of a further climate control parameter.

If the further operating element is moved in the second direction, the value of the further climate control parameter remains constant for at least the first region and is decreased for at least the second region. Furthermore, if the further operating element is moved in the third direction, the value of the further climate control parameter remains constant for at least the second region and is decreased for at least the first region.

According to another disclosed embodiment, if the further operating element is moved in the second direction, the value of the further climate control parameter remains constant for at least the second region and is increased for at least the first region. Furthermore, in this case if the further operating element is moved in the third direction, the value of the further climate control parameter remains constant for at least the first region and is increased for at least the second region.

According to at least one exemplary embodiment of the disclosed method, the value of the climate control parameter and/or the further climate control parameter is represented for the regions by the graphic element of the seat to be climate controlled. For example, the value or the values can be visualized by a colored representation. For example, the value of the climate control parameter can be represented by a first color and the value of the further climate control parameter can be represented by a second color. The dimension of the value can also be visualized by a change of the color in this case. Furthermore, this value can be represented by the color saturation. It is possible in the disclosed method to visualize for the user both the value of the climate control parameter and also the value of the further climate control parameter in a single graphic element for the transportation vehicle seat. The operating elements provided for the control of the two climate control parameters are displayed separately on the display area as switch elements in this case. However, they are operated using the same operating logic. The operation of the control of the climate control function of the transportation vehicle seat is simplified in this manner.

The climate control parameter is, for example, a seat ventilator, by which various regions of the transportation vehicle seat are ventilated. The value of the seat ventilator is displayed in this case by the graphic element by an envelope at the graphic element of the displayed transportation vehicle seat. In this way, values for the control of the seat heater and the seat ventilator can be represented simultaneously in a single graphic element.

The further climate control parameter can be a seat heater, by which various regions of the transportation vehicle seat are heated. A first region is arranged within the backrest and a second region is arranged within the seat surface. The value of the seat heater, for example, the value for the heating power of the seat heater, is represented by the graphic element, for example, by heating wires in the transportation vehicle seat represented by the graphic element. These heating wires can appear glowing, for example, based on the heating power of the seat heater in the respective region, wherein the value for the heating power is represented by the intensity of the glowing.

In the disclosed method, a display area having a touch-sensitive surface, i.e., a so-called touchscreen, is used as the input device. In this manner, the operation of the climate control parameter or parameters may be integrated into a general operating concept which uses the display area having the touch-sensitive surface. No further mechanical or electrical operating elements are therefore necessary. In this manner, the disclosed method may be implemented very cost-effectively. Moreover, installation space in the interior of the transportation vehicle can be saved by the use of the disclosed method.

An actuation in this case means that an actuating object touches the touch-sensitive surface at the switch element. The actuation is ended when the actuating object no longer touches the switch element. The back-and-forth movement of the graphic element for the seat element visualizes the degrees of freedom of the movement for this seat element in this case. In this way, the movement options of the seat element are visualized for the user.

The actuating object which is used in the disclosed method can be, for example, the fingertip of a user, an actuating stylus, or any other object.

A switch element is understood in the meaning of the disclosure as a control element of a graphic user interface. A switch element differs from elements and surfaces solely for information display, so-called display elements, in that they are selectable. Upon a selection of a switch element, a function associated therewith is executed. The function can result only in a change of the information display. Furthermore, devices can be controlled via the switch elements, the operation of which is assisted by the information display. The switch elements can therefore replace conventional mechanical switches. The switch elements can be generated arbitrarily for a freely programmable display area and displayed thereby. Furthermore, it can be provided that a switch element can be marked. In this case, the associated function is not yet executed. The marked switch element is displayed highlighted in relation to other switch elements, however. The function associated therewith is first executed upon a selection of the switch element.

According to a further exemplary embodiment of the disclosed method, an approach of an actuating object to a touch-sensitive surface of an input device is detected and, if the approach of the actuating object has been detected on the touch-sensitive surface, switch elements which can be actuated are displayed highlighted. The switch elements can be displayed highlighted in that outlines are displayed for the corresponding switch elements. Furthermore, the switch elements can be displayed in a different brightness or a different contrast. In this manner, the user can learn solely by the approach of an actuating object, for example, his fingertip, to the touch-sensitive surface which parameters can be adjusted by the touch-sensitive surface.

The disclosed device for controlling the climate control function of a transportation vehicle seat comprises a climate control device, using which a value of a climate control parameter is settable, wherein the climate control parameter controls the distribution of a climate control function in separate regions along a first direction characterized by the geometry of the transportation vehicle seat. In this case, the separate regions comprise at least one first and one second region. Furthermore, the device comprises an operating element which is movable from a neutral position in two opposing directions. Finally, the device comprises a control device, which is coupled to the climate control device and the operating element and is configured so that in the neutral position of the operating element, an equal distribution of the climate control function is generated in the regions, if the operating element is moved in one of the two opposing directions, the value of the climate control parameter remains constant for at least one region of the first and second regions and is changed for at least the other of the first and second regions.

The disclosed device is configured to completely or partially execute the disclosed method. It therefore has the same benefits as the disclosed method.

According to at least one exemplary embodiment of the disclosed device, the control device is configured so that if the operating element is moved in a second direction, the value of the climate control parameter remains constant for at least the first region and is decreased for at least the second region and if the operating element is moved in a third direction opposite to the second direction, the value of the climate control parameter remains constant for at least the second region and is decreased for at least the first region.

According to another exemplary embodiment of the disclosed device, the control device is configured so that if the operating element is moved in the second direction, the value of the climate control parameter remains constant for at least the second region and is increased for at least the first region and if the operating element is moved in the third direction opposite to the second direction, the value of the climate control parameter remains constant for at least the first region and is increased for at least the second region.

According to at least one exemplary embodiment of the disclosed device, the first region climate controlled by the climate control device is located within a backrest of the transportation vehicle seat and the second region climate controlled by the climate control device is located within a seat surface of the transportation vehicle seat. The climate control device is a seat heater and/or a seat ventilator. As explained above with reference to the disclosed method, both the value of the seat heater and the value of the seat ventilator can be controlled by the device. For this purpose, switch elements each having a slide element on a display area are displayed as the operating elements.

According to at least one exemplary embodiment of the disclosed device, it has a touch-sensitive surface for actuating the switch elements. Furthermore, the device can comprise an approach detection device, using which the approach of an actuating object to the touch-sensitive surface is detectable. The touch-sensitive surface is formed on the display area, so that a touchscreen is provided. In this manner, the adjustment of the climate control device and possibly a further climate control device can be carried out via a central operating device, which is also used for other functions of the transportation vehicle. The device for controlling the climate control function of a transportation vehicle seat can be integrated into the operating concept. Separate mechanical or electrical switches are not necessary, so that the device can be integrated in a very cost-effective and installation-space-saving manner into a transportation vehicle.

Firstly, the construction of the exemplary embodiment of the disclosed device will be explained with reference to FIG. 1:

A transportation vehicle seat 1 is arranged in a transportation vehicle. The seat comprises a seat heater as a first climate control device. The first climate control device comprises for this purpose a heating device 2-1, which is integrated into the seat surface 5, and a heating device 2-2, which is integrated into the backrest 6. Furthermore, the first climate control device comprises a first control unit 4-1 for the heating device 2-1 in the seat surface 5 and a second control unit 4-2 for the heating device 2-2 in the backrest 6.

A seat ventilator is provided as a second climate control device for the transportation vehicle seat 1. The second climate control device comprises ventilation openings 3-1 and 3-2 in the seat surface 5 and the backrest 6, to which climate-controlled air can be supplied via the ventilation units 7-1 and 7-2.

The control units 4-1, 4-2 and the ventilation units 7-1, 7-2 are coupled to a control device 11, by which the heating power of the heating devices 2-1 and 2-2 and the air exiting via the ventilation openings 3-1 and 3-2 from the transportation vehicle seat 1 can be controlled with respect to the speed and temperature thereof.

The transportation vehicle seat 1 characterizes a first direction, namely a longitudinal direction. It begins at the front edge of the seat surface 5 and then extends to the rear up to the rear edge of the seat surface 5. It merges there from the lower edge of the backrest 6 upward up to the upper edge of the backrest 6.

Two separate regions are formed in the transportation vehicle seat 1. The first region is located within the backrest 6 and the second region is located within the seat surface 5. These two regions 5 and 6 can be climate controlled separately from one another by the first and second climate control devices. The two regions 5, 6 extend along the longitudinal direction of the transportation vehicle seat 1.

The control device 11 is furthermore coupled by a data connection to a display device 12. The control device 11 comprises a display area 13, on which a touch-sensitive surface 14 is formed. A so-called touchscreen is thus provided.

Furthermore, an approach detection device 15 is arranged at the display device 12. By the approach detection device 15, the approach of an actuating object to the touch-sensitive surface 14 can be detected. The actuating object can be the fingertip of a user. Such approach detection devices 15 are known per se. The approach detection device 15 is also coupled by a data connection to the control device 11. It transmits a signal to the control device 11 when it has been detected that an actuating object is located within a detection region in front of the touch-sensitive surface 14.

If a user touches the touch-sensitive surface 14 in a specific region using an actuating object, a corresponding signal is transmitted to the control device 11. In conjunction with the corresponding display on the display area 13, the control device 11 can detect the actuation of a switch element displayed on the display area 13 in this manner. If the actuation of a switch element has been detected, the control device 11 can generate control signals for the control units 4-1, 4-2 and the ventilation units 7-1, 7-2 and control the heating power of the heating devices 2-1 and 2-2 and the air exiting via the ventilation openings 3-1 and 3-2 from the transportation vehicle seat 1 with respect to the speed and temperature thereof.

Various displays for display on the display area 13 are generated by the control device 11. The displays comprise in this case graphic elements and switch elements for the control of the climate control devices.

Figure 2:
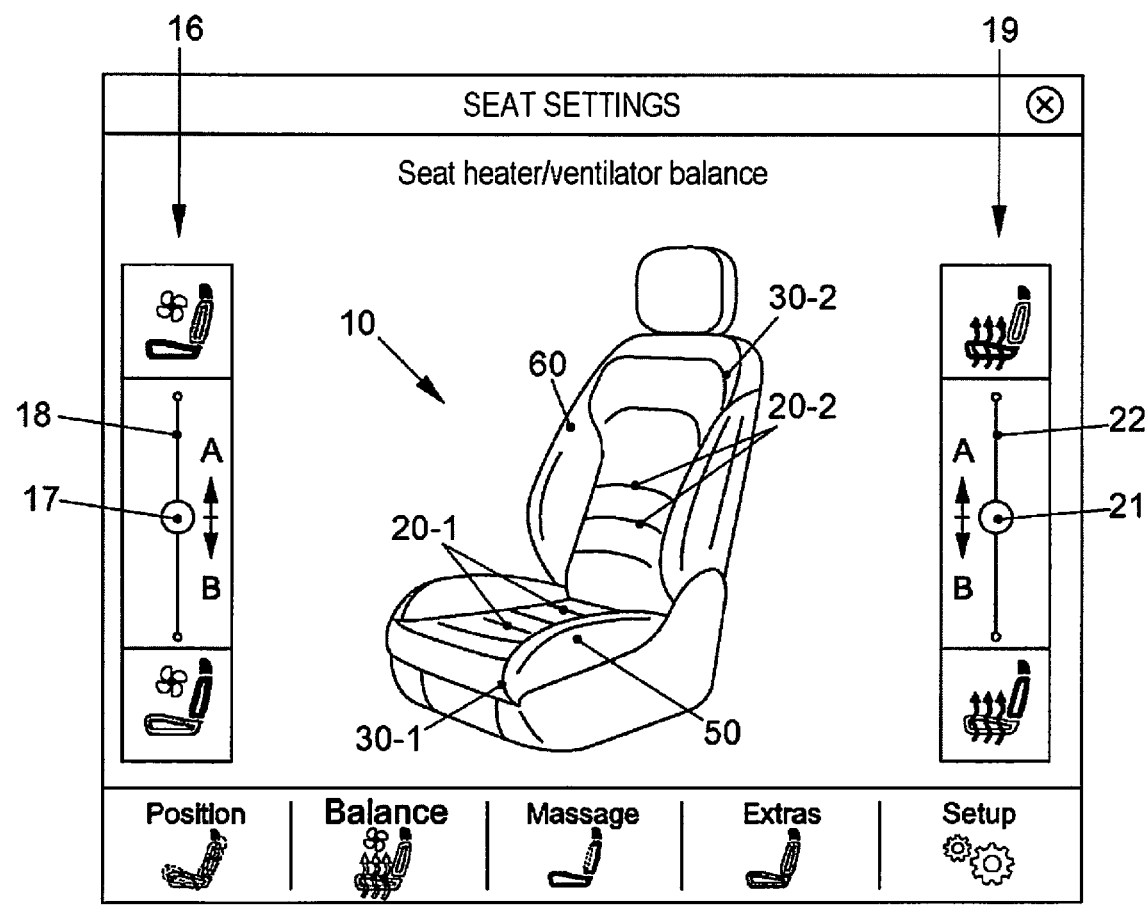
FIG. 2 shows a display on a display area generated by an exemplary embodiment of the disclosed method.

With reference to FIG. 2, a display will be explained which can be generated by the control device 11 and which is generated by the exemplary embodiment of the disclosed method:

In the display, a graphic element 10 of the transportation vehicle seat 1 to be adjusted is displayed. This graphic element 10 comprises graphic elements 50, 60 for the seat surface 5 and the backrest 6. Furthermore, graphic elements 20-1 in the graphic element 50 of the seat surface and graphic elements 20-2 in the graphic element 60 of the backrest are displayed as symbolic heating wires. Furthermore, an envelope 30-1 for the graphic element 50 of the seat surface 5 and an envelope 30-2 for the graphic element 60 of the backrest are displayed. These envelopes 30-1, 30-2 are formed like a surface coating for the graphic element 50 of the seat surface 5 or the graphic element 60 of the backrest 6, respectively.

In addition to the graphic element 10 for the transportation vehicle seat 1, a first operating element 16 for controlling the seat ventilator is displayed on the left side and a second operating element 19 for controlling the seat heater is displayed on the right adjacent to the graphic element 10. The first operating element 16 is formed as a switch element which is displayed on the display area 13. It comprises a slide element 17, which can be moved on a line 18 in the direction of the arrow A (second direction) and B (third direction). For this purpose, the user touches the touch-sensitive surface 14 using an actuating object such as his fingertip at the slide element 17 and then moves the actuating object on the touch-sensitive surface 14 in the direction of the arrow A or in the direction of the arrow B.

Similarly, the second operating element 19 is formed as a switch element displayed on the display area 13 which comprises a slide element 21 which can be moved on the line 22 in the direction of the arrows A (second direction) or B (third direction), respectively.

If the slide element 17 or 21 is located in the middle, as shown in FIG. 2, it is located in a neutral position.

If no actuating object is located in the detection region of the approach detection device 15, all graphic elements are displayed as display elements which cannot be actuated. However, if it has been detected by the approach detection device 15 that an actuating object is located in the detection region, the display elements are converted into switch elements which the user can actuate by touch. The conversion from a display element into a switch element is visualized in that the corresponding switch element is displayed brighter. Alternatively or additionally, an outline is displayed around the corresponding switch element. If the user approaches the touch-sensitive surface 14, for example, with his fingertip, a conversion of various display elements into switch elements therefore takes place upon entry of his fingertip into the detection region, so that the user can rapidly recognize which actuating options he has.

An exemplary embodiment of the disclosed method will be explained hereafter, which can be executed by the above-described exemplary embodiment of the disclosed device.

The seat heater or the seat ventilator is set in a manner known per se via a further climate control device for the transportation vehicle seat. In this further climate control device, a maximum value for the power of the seat heater and the power of the seat ventilator is also defined. By the disclosed method, it is possible to control the distribution for the seat heater and/or the seat ventilator in the two separate regions, i.e., for the seat surface 5 and the backrest 6 of the transportation vehicle seat 1 here.

The display shown in FIG. 2 is displayed on the display area 13 for the control. In this case, the slide elements 17 and 21 for the seat heater and the seat ventilator are located in a neutral position. This means that the seat surface 5 and the backrest 6 are heated and ventilated in the same manner. The value of the seat heater is represented in the graphic element 10 by the graphic elements 20-1, 20-2. These graphic elements 20-1 and 20-2 are displayed as glowing red wires.

The strength of the seat ventilator is represented by blue envelopes 30-1 and 30-2 of the graphic element 50 for the seat surface and the graphic element 60 for the backrest.

If the user wishes to change the distribution of the seat ventilator between the seat surface 5 and the backrest 6, he touches the touch-sensitive surface 14, for example, using his fingertip, at the slide element 17 of the first operating element 16. If the user now displaces the slide element 17 by his fingertip in the direction of the arrow A upward, the value for the seat ventilator for the backrest 6 remains constant. The value for the seat ventilator of the seat surface 5 decreases, in contrast. The control device 11 controls the ventilation unit 7-1 so that less air exits through the ventilation openings 3-1. At the same time, the graphic element 10 changes. The color saturation of the envelope 30-1 for the graphic element 50 for the seat surface 5 and accordingly the power of the seat ventilator for the seat surface decrease the farther the slide element 17 is moved upward in the direction of the arrow A. In the uppermost position of the slide element 17, the seat ventilator for the seat surface 5 is switched off. In this case, no envelope 30-1 for the graphic element 50 for the seat surface 5 is also displayed at the graphic element 10 for the transportation vehicle seat 1.

In contrast, if the user moves the slide element 17 downward in the direction of the arrow B by his fingertip, the control device 11 controls the ventilation unit 7-1 so that the seat ventilator remains constant. The ventilation unit 7-2, in contrast, is controlled by the control device 11 so that the value for the seat ventilator for the backrest is decreased all the more the farther the slide element 17 has been moved from the neutral position downward in the direction of the arrow B. At the same time, the control device 11 changes the display on the display area 13 such that at the graphic element 10 for the transportation vehicle seat 1, the color saturation of the blue envelope 30-2 for the graphic element 60 for the backrest 6 is decreased. In the lowermost end position of the slide element 17, the seat ventilator for the backrest 6 is switched off. Accordingly, an envelope 30-2 is also no longer displayed for the graphic element 60 in this case.

Furthermore, the user can control the seat heater by the second operating element 19 by the disclosed method. The slide element 21 can also be actuated accordingly in this case. If the user moves the slide element 21 upward in the direction of the arrow A, the control device 11 controls the control unit 4-2 so that the heating power for the backrest 6 remains constant. The control unit 4-1 for the seat surface 5 is controlled by the control device 11, in contrast, so that the heating power for the seat surface 5 is decreased. At the same time, the representation of the graphic element 10 is changed by the control device 11 so that the red color saturation of the graphic elements 20-2 for the backrest 6 remains unchanged. The color saturation of the graphic elements 20-1, which represent heating wires for the seat surface 5, is decreased, in contrast. In the uppermost position of the slide element 21, the seat heater for the seat surface 5 is switched off. The graphic elements 20-1 for the heating wires are accordingly displayed gray and no longer red.

Vice versa, if the slide element 21 is moved downward in the direction of the arrow B, in a corresponding manner the heating power for the backrest 6 is decreased. The heating power for the seat surface 5 remains constant. The graphic elements 20-1, which represent heating wires for the seat surface 5, accordingly remain unchanged, while in contrast the red color saturation of the graphic elements 20-2, which represent heating wires for the backrest 6, is decreased all the more the farther the slide element 21 is pushed downward, until the graphic elements 20-2 appear gray in the lowermost position of the slide element 21.

A further exemplary embodiment of the disclosed method will be explained hereafter, which can be executed by an alternative embodiment of the above-described device.

The seat heater or the seat ventilator is set in a manner known per se via a further climate control device for the transportation vehicle seat. In this further climate control device, a maximum value for the power of the seat heater and the power of the seat ventilator is also defined. It is also possible in the further exemplary embodiment of the disclosed method to control the distribution for the seat heater and/or the seat ventilator in the two separate regions, i.e., for the seat surface 5 and the backrest 6 of the transportation vehicle seat 1 here.

As in the above-described exemplary embodiment, the display shown in FIG. 2 is represented on the display area 13 for the control.

If the user wishes to change the distribution of the seat ventilator between the seat surface 5 and the backrest 6, he touches the touch-sensitive surface 14, for example, with his fingertip, at the slide element 17 of the first operating element 16. If the user now displaces the slide element 17 upward in the direction of the arrow A by his fingertip, the value for the seat ventilator for the seat surface 5 remains constant. The value for the seat ventilator of the backrest 6 increases, in contrast. The control device 11 controls the ventilation unit 7-2 so that more air exits through the ventilation openings 3-2. At the same time, the graphic element 10 changes. The color saturation of the envelope 30-2 for the graphic element 60 for the backrest 6 and accordingly the power of the seat ventilator for the backrest 6 increase the farther the slide element 17 is moved upward in the direction of the arrow A. In the uppermost position of the slide element 17, the seat ventilator for the backrest 6 is maximally switched on.

In contrast, if the user moves the slide element 17 downward in the direction of the arrow B by his fingertip, the control device 11 controls the ventilation unit 7-2 so that the seat ventilator remains constant. The ventilation unit 7-1, in contrast, is controlled by the control device 11 so that the value for the seat ventilator for the seat surface is increased all the more the farther the slide element 17 has been moved downward in the direction of the arrow B from the neutral position. At the same time, the control device 11 changes the display on the display area 13 such that at the graphic element 10 for the transportation vehicle seat 1, the color saturation of the blue envelope 30-1 for the graphic element 50 for the seat surface 5 is increased. In the lowermost end position of the slide element 17, the seat ventilator for the seat surface 5 is maximally switched on.

Furthermore, the user can control the seat heater by the second operating element 19 in the further exemplary embodiment. The slide element 21 can also be actuated accordingly in this case. If the user moves the slide element 21 upward in the direction of the arrow A, the control device 11 controls the control unit 4-1 so that the heating power for the seat surface 5 remains constant. The control unit 4-2 for the backrest 6 is controlled by the control device 11, in contrast, so that the heating power for the backrest 6 is increased. At the same time, the representation of the graphic element 10 is changed by the control device 11 so that the red color saturation of the graphic elements 20-1 for the seat surface 5 remains unchanged. The color saturation of the graphic elements 20-2, which represent heating wires for the backrest 6, is increased, in contrast. In the uppermost position of the slide element 21, the seat heater for the seat surface 5 is maximally switched on.

If, vice versa, the slide element 21 is moved downward in the direction of the arrow B, in a corresponding manner the heating power for the seat surface 5 is increased. The heating power for the backrest 6 remains constant. The graphic elements 20-2, which represent heating wires for the backrest 6, accordingly remain unchanged, while in contrast the red color saturation of the graphic elements 20-1, which represent heating wires for the seat surface 5, is increased all the more the farther the slide element 21 is pushed downward.

LIST OF REFERENCE SIGNS 1 transportation vehicle seat
2-1, 2-2 heating devices
3-1, 3-2 ventilation openings
4-1, 4-2 control units
5 seat surface
6 backrest
7-1, 7-2 ventilation units
10 graphic element
11 control device
12 display device
13 display area
14 touch-sensitive surface
15 approach detection device
16 first operating element
17 slide element
18 line
19 second operating element
20-1, 20-2 graphic elements
21 slide element
22 line
30-1, 30-2 displayed envelope
50 graphic element
60 graphic element
A second direction
B third direction

The invention claimed is:

1. A method for controlling a climate control function of a transportation vehicle seat, the method comprising:
setting a value of a climate control parameter in response to operation of an operating element which is movable from a neutral position in two opposing directions, wherein the climate control parameter controls distribution of the climate control function in separate regions along a first direction associated with geometry of the transportation vehicle seat, wherein the separate regions comprise at least one first and one second region;
generating an equal distribution of the climate control function in the first and second regions in the neutral position of the operating element;
in response to the operating element being moved in one of the two opposing directions, maintaining the value of the climate control parameter constant for at least one region of the first and second regions and changing the value of the climate control parameter for at least the other of the first and second regions;
maintaining the value of the climate control parameter constant for at least the first region and decreasing the value of the climate control parameter for the at least the second region in response to the operating element being moved in a second direction; and
in response to the operating element being moved in a third direction opposite to the second direction, maintaining the value of the climate control parameter constant for at least the second region and decreasing the value of the climate control parameter for the at least the first region.

2. The method of claim 1, wherein the value of the climate control parameter is further decreased for the second region the greater a distance of the operating element is from the neutral position in the second direction.

3. The method of claim 1 wherein the value of the climate control parameter is further decreased for the first region the greater a distance of the operating element is from the neutral position in the third direction.

4. The method of claim 1, wherein the operating element comprises a slide element.

5. The method of claim 4, wherein the slide element is a switch element displayed on a display area.

6. The method of claim 5, wherein a graphic element of the transportation vehicle seat to be climate controlled is displayed on the display area, and the switch element is arranged on the display area so that a displacement of the slide element represented by the switch element in the second direction represents an association with the backrest of the transportation vehicle seat represented by the graphic element, and a displacement of the slide element represented by the switch element in the third direction represents an association with a seat surface of the transportation vehicle seat represented by the graphic element.

7. The method of claim 1, further comprising:
controlling a value of a further climate control parameter in response to operation of a further operating element, wherein the further climate control parameter controls distribution of a further climate control function in the separate regions along the first direction;
generating an equal distribution of the further climate control function in the regions in response to the further operating element being in a neutral position; and
maintaining the value of the further climate control parameter constant for at least one region of the first or second regions and changing the further climate control parameter for at least the other of the first and second regions in response to the further operating element being moved in one of two opposing directions.

8. The method of claim 7, wherein the value of the further climate control parameter is maintained constant for at least the first region and is decreased for at least the second region in response to the further operating element being moved in the second directions, and wherein the value of the further climate control parameter is maintained constant for at least the second region and is decreased for at least the first region in response to the further operating element being moved in the third direction.

9. The method of claim 7, wherein:

the value of the further climate control parameter is maintained constant for at least the second region and is increased for at least the first region in response to the further operating element being moved in the second direction; and the value of the further climate control parameter is maintained constant for at least the first region and is increased for at least the second region in response to the further operating element being moved in the third direction.

10. The method of claim 7, wherein the value of the climate control parameter and/or the further climate control parameter is represented for the regions by a graphic element of the seat to be climate controlled.

11. The method of claim 7, wherein the further climate control parameter is a seat heater, by which the first and second regions of the transportation vehicle seat are heated.

12. The method of claim 11, wherein the value of the seat heater is displayed by a graphic element by heating wires in the transportation vehicle seat represented by the graphic element.

13. The method of claim 1, wherein the climate control parameter is a seat ventilator, by which the first and second regions of the transportation vehicle seat are ventilated.

14. The method of claim 13, wherein the value of the seat ventilator is displayed by a graphic element by an envelope at the graphic element of the represented transportation vehicle seat.

15. A device for controlling a climate control function of a transportation vehicle seat, the device comprising:

a climate control device that uses a settable value of a climate control parameter to control distribution of the climate control function in separate regions along a first direction associated with geometry of the transportation vehicle seat, wherein the separate regions comprise at least one first and one second region;

an operating element, which is movable from a neutral position in two opposing directions; and a control device, which is coupled to the climate control device and the operating element and is configured so that an equal distribution of the climate control function is generated in the regions in the neutral position of the operating element in response to the operating element being moved in one of the two opposing directions, the value of the climate control parameter is maintained constant for at least one region of the first and second regions and is changed for at least the other of the first and second regions, wherein the control device is configured so that the value of the climate control parameter remains constant for at least the first region and is decreased for at least the second region in response to the operating element being moved in a second direction, and the value of the climate control parameter remains constant for at least the second region and is decreased for at least the first region in response to the operating element being moved in a third direction opposite to the second direction.

16. The device of claim 15, wherein the first region climate controlled by the climate control device is located within a backrest of the transportation vehicle seat and the second region climate controlled by the climate control device is located within a seat surface of the transportation vehicle seat.

17. The device of claim 15, wherein the climate control device is a seat heater and/or a seat ventilator.

* * * * *